United States Patent
Adams, Jr. et al.

[11] Patent Number: 5,866,260
[45] Date of Patent: Feb. 2, 1999

[54] MASKED GLAZING PANELS

[75] Inventors: Lawrence O. Adams, Jr., Tigard; Kirk C. McCammon, Portland; Larry J. Henry, Tigard; Wayne C. Metcalfe, Wilsonville, all of Oreg.

[73] Assignee: Oregon Glass Company, Wilsonville, Oreg.

[21] Appl. No.: 792,538

[22] Filed: Jan. 31, 1997

Related U.S. Application Data

[63] Continuation of Ser. No. 707,613, May 30, 1991, Pat. No. 5,599,422.

[51] Int. Cl.$^6$ ...................................................... B32B 17/06
[52] U.S. Cl. ............................ 428/426; 428/428; 52/203; 52/746
[58] Field of Search ................................ 428/38, 46, 416, 428/424, 458, 334, 426, 428; 156/104, 106, 307, 308, 280; 264/230, 342; 52/203, 746, 211

[56] References Cited

U.S. PATENT DOCUMENTS

| | | |
|---|---|---|
| 1,256,818 | 2/1918 | Nile . |
| 1,562,948 | 11/1925 | Elliott . |
| 1,843,432 | 2/1932 | Nickerson . |
| 1,847,574 | 3/1932 | Sigel . |
| 2,004,878 | 6/1935 | MacNaught . |
| 2,639,254 | 5/1953 | Smith . |
| 2,819,656 | 1/1958 | Patterson . |
| 2,875,672 | 3/1959 | Cross . |
| 2,951,304 | 9/1960 | Herte . |
| 2,977,017 | 3/1961 | Herzig . |
| 2,979,025 | 4/1961 | Mund . |
| 3,023,464 | 3/1962 | Zerbe . |
| 3,077,059 | 2/1963 | Stout . |
| 3,139,352 | 6/1964 | Coyner . |
| 3,291,669 | 12/1966 | Osler . |
| 3,358,355 | 12/1967 | Youssi et al. . |
| 3,575,790 | 4/1971 | Fleck . |
| 3,693,510 | 9/1972 | Langan . |
| 4,041,663 | 8/1977 | Mazzoni .................................... 52/203 |
| 4,061,808 | 12/1977 | Sato . |
| 4,075,386 | 2/1978 | Willdorf ................................... 428/216 |
| 4,405,228 | 9/1983 | Musoplat . |
| 4,552,789 | 11/1985 | Winchell . |
| 4,657,796 | 4/1987 | Musil et al. . |
| 4,675,062 | 6/1987 | Instance . |
| 4,680,080 | 7/1987 | Instance . |
| 4,776,906 | 10/1988 | Bernard ..................................... 156/85 |
| 4,888,078 | 12/1989 | Instance . |
| 4,894,106 | 1/1990 | Instance . |
| 4,971,130 | 11/1990 | Bentley . |
| 5,030,288 | 7/1991 | Swensen . |
| 5,091,239 | 2/1992 | Przeworski et al. . |
| 5,107,643 | 4/1992 | Swensen . |

*Primary Examiner*—Merrick Dixon
*Attorney, Agent, or Firm*—Klarquist Sparkman Campbell Leigh & Whinston, LLP

[57] ABSTRACT

Glazing panels, such as window panes, are protected by sheets of masking material which cover central regions of the panel surfaces and which leave marginal regions uncovered. The masked panels are installed in frames which can thereafter be sanded or painted or otherwise chemically treated. Prior to and during such treatments, the surfaces of the panels are protected by the masking material. After all installation and treatment procedures are complete, the masking material is removed to expose the clean central regions of the panel surfaces.

11 Claims, 4 Drawing Sheets

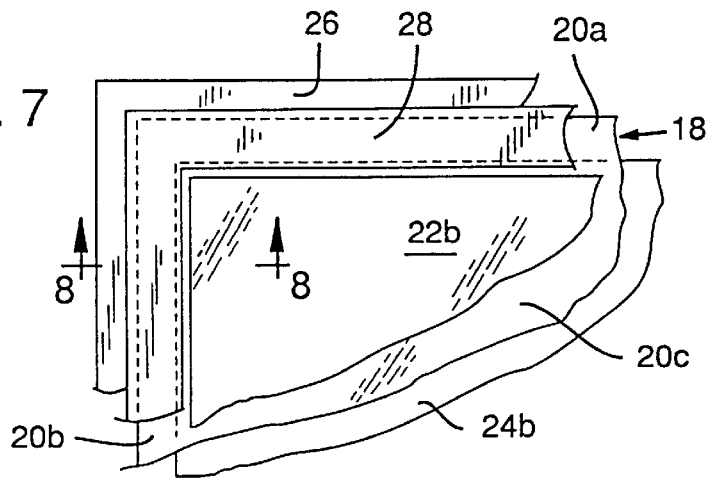
FIG. 7
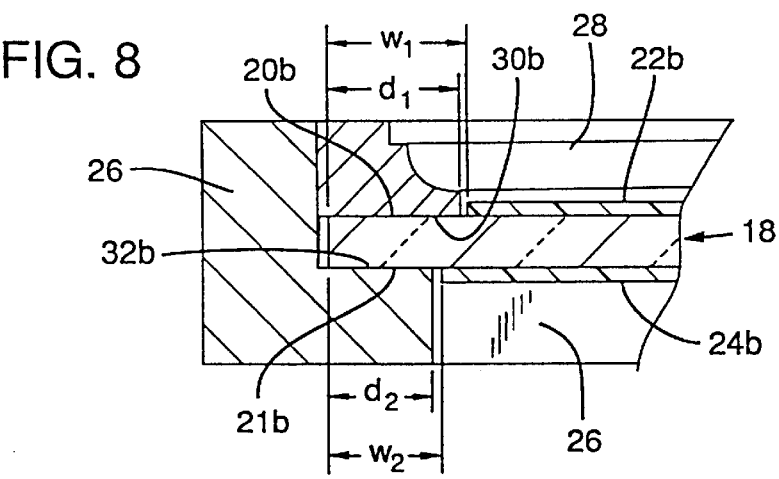
FIG. 8
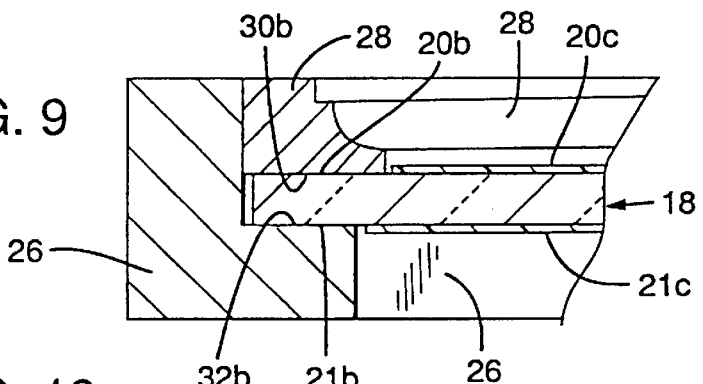
FIG. 9
FIG. 10
Prior Art
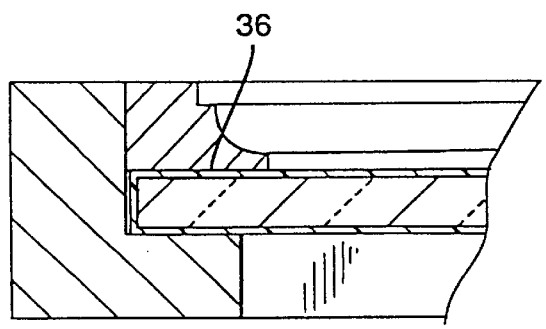

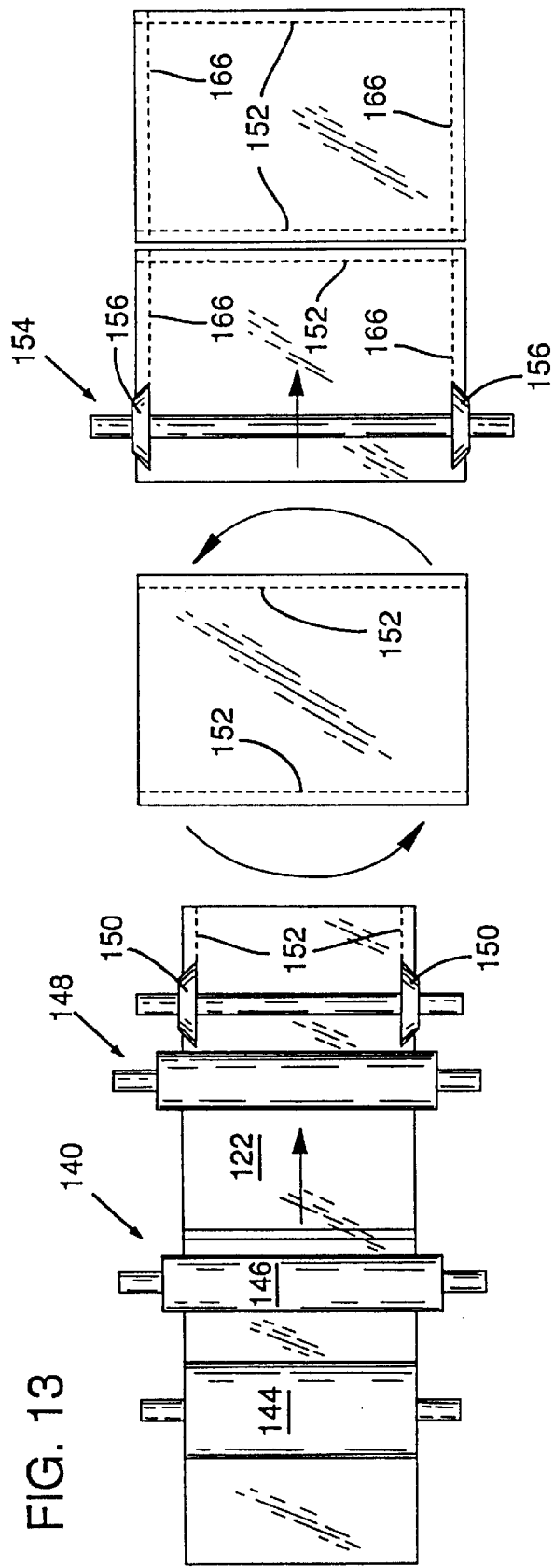

MASKED GLAZING PANELS

This is a continuation, of application Ser. No. 07/707,613, filed May 30, 1991, now U.S. Pat. No. 5,599,422.

SUMMARY OF THE INVENTION

The present invention relates to the masking of a glazing panel that is installed into a frame prior to painting or some other treatment of the frame.

It is common practice to assemble frames, such as window frames, French doors or mirror frames at a central manufacturing location. As part of the assembly process, glazing panels are installed. The glazing panels can be made of any of several common materials such as panes of glass or plastic, mirror panes, and vinyl or wood panels.

The frame, with one or more glazing panels installed, is then delivered to an installation site where paint or some other treating substance is to be applied to match the surrounding decor. In most such installations, it is desired that the treating substance not be applied to the glazing panels.

In the past, painting, staining, or other chemical treatment of such frames, after glazing panels are installed, has been a laborious process requiring much handwork to prevent stray paint or other substances from adhering to the panels. It has been necessary to manually mask the panels, to unmask the panels, or to paint the frames very cautiously. When such steps have not been taken, it has been necessary to scrape the panels clear after treatment.

One approach to easing the painting of window frames has been to encase glass panes in shrink wrap plastic before they are installed in a frame. The shrink wrap plastic sheeting protects the panes while the window frames are being painted. But, in order to remove the plastic after painting, a worker must hand cut the boundaries of each sheet with a knife. And, after the cutting, a perimeter portion of each masking sheet remains trapped between the pane and frame. This residual strip of flexible plastic material is not secured by an adhesive and can work loose and/or deteriorate with time. This causes the pane to be loose within the frame. Because the presence of such residual shrink wrap material makes it is impossible to seal the panes in the frame, shrink wrap encased panes are inappropriate for use in exterior doors and windows. Such an exterior application of shrink wrapped panes would leave holes in the heat insulation barrier of a building.

The present invention comprises a system whereby one or both surfaces of glazing panels are protected by masking material during painting of their frames and during their transport and installation.

The masking material is applied to a center portion of a surface of a panel before it is installed in the frame, but a perimeter portion is left uncovered. When the frame is assembled, only the uncovered portion of the panel is received within the frame. This allows the masking material to be easily peeled away without cutting and without leaving any residue between the frame and the panel. And, because no masking material remains within the frame, gaps are avoided.

Accordingly, it is an object of this invention to ease the painting or other treatment of frames into which glazing panels have been installed.

A further object is to protect glazing panels from abrasion damage, such as scratching, prior to their ultimate installation.

This and other features, objects, and advantages of the invention will be apparent from the drawings and detailed description.

BRIEF DESCRIPTION OF THE DRAWINGS

In the drawings:

FIGS. 1A–6A are schematic diagrams showing progressive steps for making and using a glazing assembly according to the present invention;

FIGS. 1B–6B are enlarged partial sectional views taken along lines 1B–6B—1B–6B respectively;

FIG. 7 is a partial plan view of a frame holding a glazing assembly of the type shown in FIG. 4;

FIG. 8 is a partial sectional view taken along line 8—8 of FIG. 7;

FIG. 9 is a partial sectional view taken along line 8—8 of FIG. 7 showing the frame and assembly after the masking material has been removed;

FIG. 10 is a partial sectional view which illustrates a prior art assembly for comparison with the assembly shown in FIG. 9;

FIG. 13 is a top plan schematic view of a second apparatus for installing masking material on a glazing pane.

DETAILED DESCRIPTION

FIGS. 1–6 illustrate a procedure for making a glazing assembly according to the present invention.

Figure 1A:
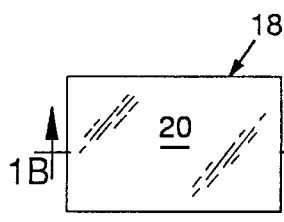
Figure 1B:
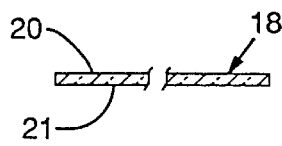

FIG. 1 shows a typical glazing panel that has been cut to the appropriate dimensions for future installation in a frame. The frame could be a true divided light window frame, French door, picture frame, mirror frame, or any similar frame which holds a panel or pane. The drawings show a glass pane 18, but the panel could be made of any sheet-like material such as plastic sheeting, mirrored glass, decorative vinyl sheeting, wood sheeting or the like.

The illustrated glazing pane 18 has a first planar surface 20, a second planar surface 21, and four edge surfaces. In a first step, bodies of masking material 22, 24 are respectively positioned on the surfaces 20, 21 of the pane 18. In the illustrated embodiment of FIG. 2, the bodies 22, 24 cover the entire areas of the surfaces 20, 21.

Figure 3A:
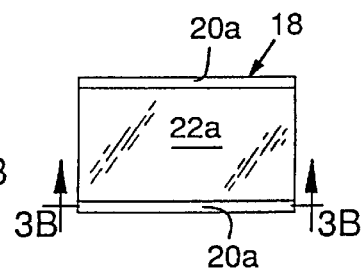

Next, strips of the masking material are removed from two margin regions 20a which extend along opposite edges of the surface 20. This leaves a body 22a of masking material as shown in FIG. 3A. The body 22a is of a lesser area than body 22. Strips are similarly removed from margin regions of the surface 21.

Figure 4A:
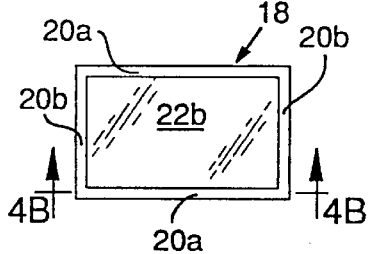
Figure 5A:
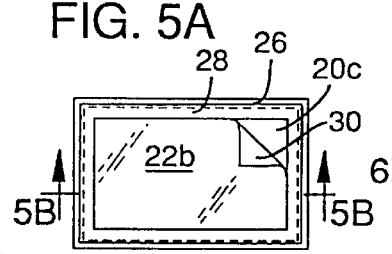
Figure 6A:
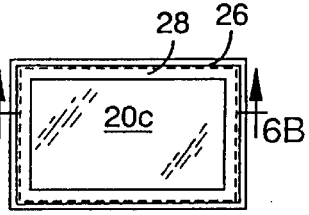
Figure 4B:
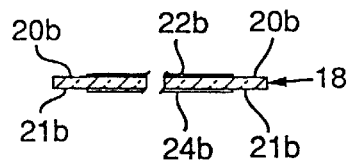

Next, strips of the masking material are removed from other marginal portions 20b of the surface 20 leaving a body 22b of masking materials that is of still smaller area as shown in FIG. 4. The marginal regions 20a and 20b are together referred to herein as a perimeter region of the surface 20. The remainder of the surface 20, which remainder is covered by the body 22b, is referred to herein as a central region 20c. Strips are similarly removed from the margin regions 21b of the surface 21; and the names of the regions of surface 21 are analogous to the names used when describing the regions of surface 20. In this manner, an uninstalled glazing assembly, as shown in FIG. 4, is completed.

Figure 5B:
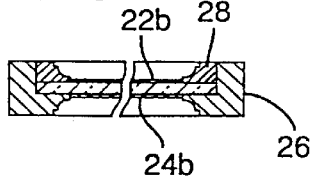
Figure 6B:
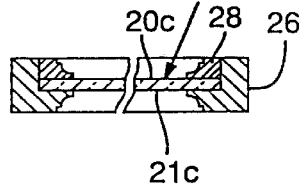

FIG. 5 show the assembly of FIG. 4 after it is installed in a wooden frame that is sized and shaped to receive the pane. The frame includes a backing frame 26 and retainer moldings 28. It is at this stage, after the glazing pane 18 has been installed in the frame and while the bodies 22b, 24b of masking material are still in place, that the frame is painted or otherwise treated. The bodies 22b, 24b protect the central regions 20c, 21c of the surfaces 20, 21 while the frame is being painted. The central regions are substantially the entire areas of the surfaces 20, 21 that are not hidden by the frame.

After painting is complete, the bodies 22b, 24b are removed. For example, a worker grasps a corner portion 30 (FIG. 5A) of the body 22b and pulls it away, thus uncovering the central portion 20c of the surface 20. The result is the completed window assembly shown in FIG. 6.

FIGS. 7 and 8 show an enlarged view of an installed glazing assembly similar to that shown in FIG. 5. FIG. 9 shows a view of that installed glazing assembly, after painting of the frame and removal of the masking material, similar to the assembly shown in FIG. 6. These figures illustrate how the widths $w_1$, $w_2$ of the perimeter portions 20b, 21b are not less than the distances $d_1$, $d_2$ that the panel 18 will extend along facing surfaces 30b, 32b of the frame members 28, 26 when the panel 18 is installed.

Ideally, the corresponding widths and the distances, e.g., $w_1$ and $d_1$, will be equal along each edge of the panel. However, to provide tolerance for manufacturing variations, one can choose a margin portion width, e.g., $w_1$, which is slightly larger than the distance, e.g., $d_1$, that the pane will extend into the frame. It is not necessary that the distances $d_1$, $d_2$ be equal. And, the width of the perimeter region of the panel surfaces need not be the same along each edge of the panel. The system of the present invention will work regardless of the relative dimensions of the panel and the frame opening which receives the panel.

FIGS. 7–9 also show how the perimeter portions of the panel 18, such as portions 20b, 21b directly contact the facing surfaces 30b, 32b of the frame. This is unlike the situation of prior art devices, as shown in FIG. 10, wherein a residual body 36 of masking material is left between the pane surfaces and the facing surfaces of the frame after installation.

A preferred masking material for use according to this invention is a flexible sheet of transparent or translucent plastic material such as polymask brand sheeting manufactured by Sealed Air Corp. Other masking materials, such as paper, can be used. But, a degree of transparency is desireable so that any flaws in the panel can be seen through the masking material. If an opaque masking material is used, a flaw could be covered and thus remain undetected until after the panel had been installed and the frame painted. The material should be sufficiently impervious to paint, stain, and the like so as to be suitable as a masking material.

The masking material may be attached by means of an adhesive which releasably secures the material to the surface or by static cling. Any adhesive used to secure the masking material should be selected to favor adherence to the masking material so that, when the material is removed, no adhesive residue remains on the panel.

Figure 11:
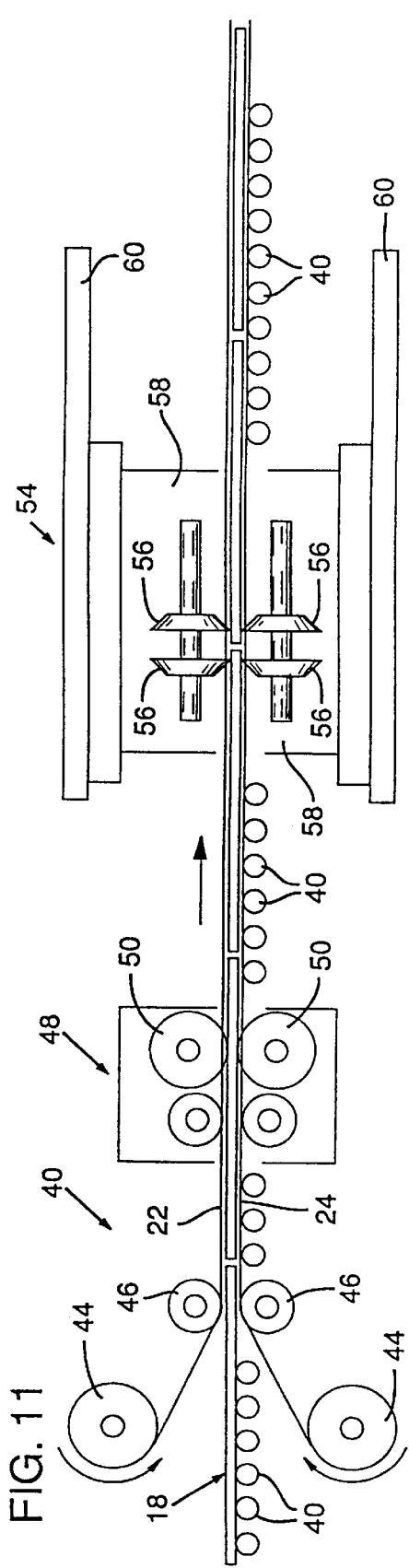
FIG. 11 is an elevational schematic view of an apparatus according to the present invention for installing masking material on a glazing pane.
Figure 12:
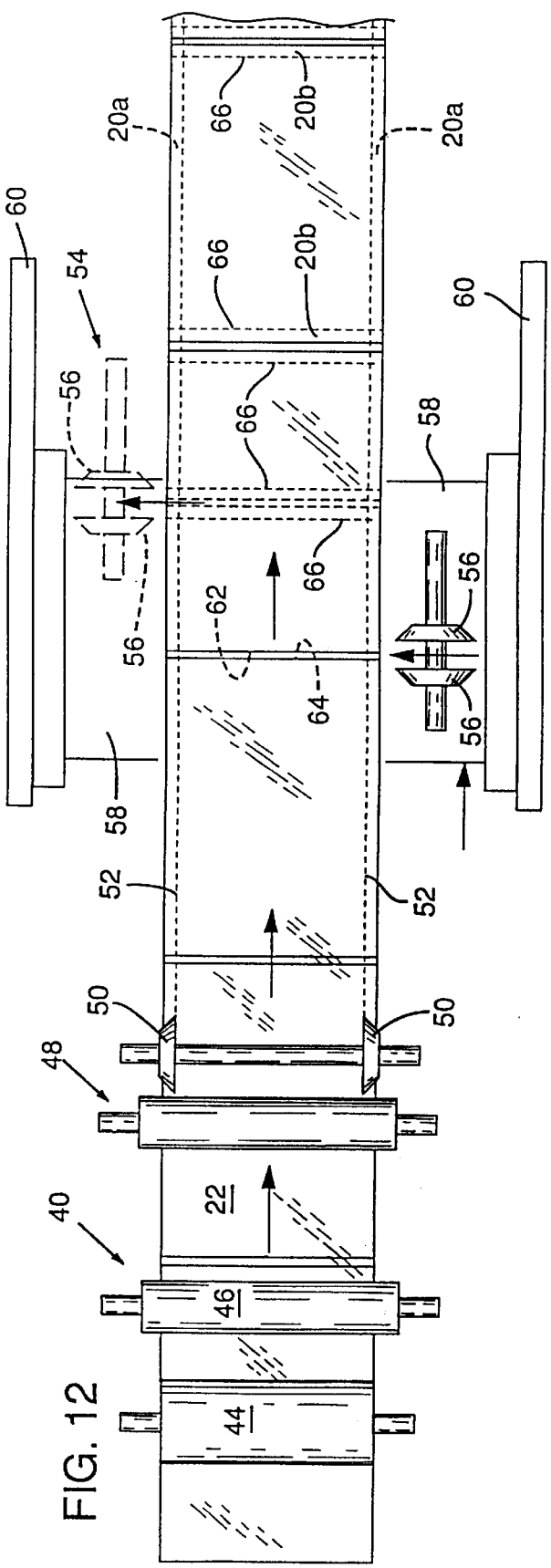
FIG. 12 is a top plan schematic view of the apparatus showing FIG. 11.

FIGS. 11 and 12 show an apparatus for continuously making glazing assemblies according to the steps shown in FIGS. 1–6. In the illustration of FIGS. 11 and 12, the panels 18 are glass panes which are supported on a conveyor rolls 40 which serve as a panel support. Panes move along a path from left to right in FIGS. 11–12. As the panes move, they first encounter a laminator 40 wherein bodies 22, 24 of masking material are delivered to the panes from supply rolls 44. An applicator mechanism, including pinch rolls 46, receives the sheets of masking material and applies them onto the surfaces of the panes 18.

One or more cutting mechanisms are provided to remove strips of the masking material from the perimeter regions of the panes. These cutting mechanisms can take a variety of forms. In FIGS. 11–12, a first cutting assembly 48 includes four circular scoring knives 50 which contact the passing panes. The knives 50 cut longitudinal score lines 52 in the bodies 22, 24 of masking material. A drive mechanism may be provided to rotate the knives 50 or the knives 50 can be mounted as idlers which are rotated by frictional contact with the passing panes. The edge strips produced by such cutting can be removed to expose side margins of the pane surfaces.

FIGS. 11–12 show a second cutter assembly 54 that is provided downstream from the first cutter assembly 48. The second cutting assembly comprises four scoring knives 56 mounted on a carriage 58. The carriage 58 is adapted to travel on rails 60 parallel to the path of the panes 18. As best seen in FIG. 12, the panes 18 move edge to edge with little or no space between adjacent panes. When a pane 18 reaches the second cutter assembly, the webs which comprise the bodies 22, 24 of masking material are cut so that the panes can be separated and the end margin portions 20b, 21b can be uncovered. This cutting is accomplished by means of the knives 56. As the facing edges 62, 64 of two panes travel to the point where they are aligned between two blades 56 as shown in FIGS. 11–12, the second cutter assembly is actuated. Thereafter, the carriage 58 moves longitudinally at the same rate as the panes while scoring knives 56 are moved across the panes from one side of the path as shown in solid lines in FIG. 12 to a position at the other side of the path as shown by broken lines in FIG. 12. As the scoring knives 56 move across the panes, they cut lateral score lines 66 into the sheets of masking material so that strips of the masking material sheets can be removed from marginal regions 20b, 21b of the surfaces 20, 21. Thereafter, the panes are ready to be removed from the line.

A variety of techniques can be used to remove the marginal strips of masking material which are provided by cutting the score lines 52, 66. The strips can easily be peeled off manually by a worker. Or, stripping heads (not shown) can be provided along the edges of the conveyor and/or on the carriage 58 to automatically contact and peel off the marginal strips of the web.

Numerous variations are possible in the manufacturing apparatus. For example, instead of the illustrated first cutter assembly 48, one or more knives could be located between the supply rolls 44 and the pinch rolls 46 to cut off an edge portion from one or both side edges of the masking material webs before the pinch rolls apply those webs to the panes 18. With this type of apparatus, one bypasses the step illustrated in FIG. 2. Instead, assemblies of the type shown in FIG. 3, with exposed side margins, are obtained as soon as the webs are applied to the panes.

Figure 2A:
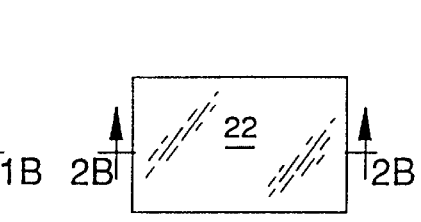
Figure 2B:
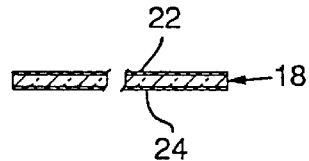

Another way of bypassing the step shown in FIG. 2 is to use supply rolls 44 which contain webs of masking material which are manufactured to be of the desired width. Using such webs, it is unnecessary to cut off portions and thus unnecessary to use a first cutter assembly 48 either before or after the pinch rolls 46. The side margins of the surface remain uncovered when the webs are applied.

One can use different cutting assemblies than those shown in FIGS. 11–12. For example, the traveling carriage mechanism 58 can be eliminated by separating the panes and rotating them ninety degrees before they enter the second cutter assembly. Such an arrangement is shown in FIG. 13, wherein the reference numerals correspond to those appearing in FIG. 12, but are incremented by one hundred. In such an arrangement, the second cutter assembly 154 could include knives 156 that are similar to the knives 150 of the first cutter assembly 148.

Figure 3B:
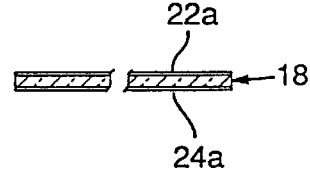

Finally, it is possible to skip both the stages shown in FIGS. 2 and 3. This can be accomplished by adhering pre-cut bodies 22b and/or 24b to the pane 18. Such bodies are precut to appropriate size and shape and then positioned to cover the central region of one or both surfaces of each pane. Although ease of painting would be achieved, this method of attaching the bodies would be more difficult to automate.

While we have described and illustrated various embodiments of our inventions, it will be apparent to those skilled in the art that many changes and modifications may be made without departing from the invention in its broader aspects. For example, masking material need be applied to only one side of a panel if only one side of the frame is to be painted or otherwise treated after the panel is installed. Also, in the drawings, the bodies 22b, 24b cover the entire central regions 20c, 21c of the panel 18. This is usually the best and most convenient arrangement. However, for large panels, the bodies 20c, 21c would not necessarily have to cover the centermost region of the surfaces 20, 21. The appended claims are, therefore, intended to cover all such changes and modifications as followed in the true spirit and scope of the invention.

We claim:

1. A glazing assembly comprising:

an uninstalled glazing panel that is sized and shaped to be installed in a frame which receives at least one edge of the panel; and a body of masking material positioned on one surface of the panel, the body being sized, shaped and positioned to cover a central region of the surface and not to cover a perimeter region of the surface, the width of the perimeter region being not less than the distance the panel will extend along a facing surface of the frame when the panel is installed.

2. The assembly of claim 1 wherein a second body of masking material is positioned on the other surface of the panel, the second body being sized and shaped to cover a central region of the other surface and not to a perimeter region of the other surface, the width of the perimeter region of the other surface being not less than the distance the panel will extend along a facing surface of the frame when the panel is installed.

3. The assembly of claim 1 wherein the panel is a pane of glass.

4. The assembly of claim 1 wherein the panel is a mirror pane.

5. The assembly of claim 1 wherein the width of the perimeter region is substantially the same as the distance the panel will extend along the facing surface.

6. The assembly of claim 1 wherein the central region that is covered by the body is substantially the entire area of the surface that is not hidden by the frame when the panel is installed.

7. The assembly of claim 1 wherein the central region that is covered by the body is less than the entire area that is not hidden by the frame when the panel is installed.

8. The assembly of claim 1 wherein the masking material comprises plastic sheeting.

9. The assembly of claim 1 further comprising an adhesive material which releasably secures the body to the surface.

10. The assembly of claim 1 wherein at least a region of the body is sufficiently transparent to allow viewing of the panel through the body.

11. A window pane assembly comprising:

an uninstalled window pane that has two surfaces and that is sized and shaped to be installed in a window frame; and two sheets of masking material, one sheet being adhered to each surface of the pane, each sheet being sized, shaped and positioned to entirely cover a central region of the surface to which it is adhered and not to cover a perimeter region of that surface, the width of the perimeter region, which width need not be uniform around the entire perimeter region, being substantially the same as the distance the pane will extend along a facing surface of the frame when the pane is installed, and at least one of the sheets being sufficiently transparent to allow viewing of the pane through that sheet.

* * * * *